US009860383B2

(12) United States Patent
Albert et al.

(10) Patent No.: US 9,860,383 B2
(45) Date of Patent: *Jan. 2, 2018

(54) METHOD AND APPARATUS FOR MANAGING VOICEMAIL IN A COMMUNICATION SESSION

(71) Applicant: Mitel Networks Corporation, Ottawa (CA)

(72) Inventors: John Albert, Kanata (CA); Jianqi (Jerry) Yin, Ottawa (CA); Kavita Jain, Nepean (CA); Liang Zhou, Kanata (CA); Thomas Gray, Mansfield (CA)

(73) Assignee: Mitel Networks Corporation, Ottawa, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/225,253

(22) Filed: Mar. 25, 2014

(65) Prior Publication Data

US 2015/0281457 A1 Oct. 1, 2015
US 2017/0180556 A9 Jun. 22, 2017

Related U.S. Application Data

(63) Continuation of application No. 12/316,484, filed on Dec. 12, 2008, now Pat. No. 8,681,948.

(51) Int. Cl.
 *H04M 1/64* (2006.01)
 *H04M 3/533* (2006.01)
(52) U.S. Cl.
 CPC ................ *H04M 3/53366* (2013.01)
(58) Field of Classification Search
 CPC ................................. H04M 3/53366

USPC ...................................................... 379/88.22
See application file for complete search history.

(56) References Cited

U.S. PATENT DOCUMENTS

| 5,623,538 | A | * | 4/1997 | Petty | ................. | H04M 1/6505 |
| | | | | | | 348/14.06 |
| 5,687,220 | A | * | 11/1997 | Finnigan | ............... | H04M 3/533 |
| | | | | | | 379/196 |
| 5,781,615 | A | | 7/1998 | Bales et al. | | |
| 5,903,627 | A | * | 5/1999 | Shaffer | ............... | H04L 12/5805 |
| | | | | | | 379/67.1 |

(Continued)

FOREIGN PATENT DOCUMENTS

WO  WO 01/84334 A1  11/2001
WO  WO 02/23874 A   3/2002

(Continued)

OTHER PUBLICATIONS

Kim, Tai Joon: "A downemail system: an internet email system based on sender mailbox", Communications, 2003, APPC 2003. IEEE vol. 1 Sep. 21, 2003; pp. 87-90 NJ.

(Continued)

*Primary Examiner* — Van D Huynh

(57) ABSTRACT

A system, method and apparatus for managing voicemail in a communication session between a sending communication device and a receiving communication device are provided. It is determined at the receiving communication device that a voicemail is to be created. The voicemail based on content received via the sending communication device. The voicemail is recorded. The voicemail is caused to be stored at resources associated with the sending communication device.

17 Claims, 12 Drawing Sheets

(56) References Cited

U.S. PATENT DOCUMENTS

| | | |
|---|---|---|
| 6,002,751 A | 12/1999 | Shaffer |
| 6,029,168 A | 2/2000 | Frey |
| 6,181,780 B1 | 1/2001 | Finnigan |
| 6,396,908 B1 | 5/2002 | O'Donovan et al. |
| 6,683,940 B2 | 1/2004 | Contractor |
| 6,807,565 B1 | 10/2004 | Dodrill et al. |
| 7,136,927 B2 | 11/2006 | Traversat et al. |
| 7,177,917 B2 | 2/2007 | Giotta |
| 7,190,950 B1 * | 3/2007 | Baker .................. H04M 3/533 379/1.02 |
| 7,813,482 B2 | 10/2010 | Girouard et al. |
| 2001/0036256 A1 | 11/2001 | Larsson et al. |
| 2002/0085686 A1 | 7/2002 | Cullis |
| 2002/0126805 A1 | 9/2002 | Finnigan |
| 2002/0184358 A1 | 12/2002 | Traversat et al. |
| 2004/0156493 A1 | 8/2004 | Cohen |
| 2004/0254990 A1 | 12/2004 | Mittal |
| 2007/0071200 A1 * | 3/2007 | Brouwer ................. H04M 1/57 379/142.05 |
| 2007/0124384 A1 | 5/2007 | Howell et al. |
| 2007/0195751 A1 * | 8/2007 | Cai ........................ H04L 12/66 370/352 |
| 2008/0123823 A1 | 5/2008 | Pirzada et al. |
| 2008/0285729 A1 | 11/2008 | Glasgow |

FOREIGN PATENT DOCUMENTS

| | | |
|---|---|---|
| WO | WO 2004/084530 A | 9/2004 |
| WO | WO 2007/101839 A | 9/2007 |

OTHER PUBLICATIONS

Turner, D.A. et al.: "Continuous media e-mail on the internet: infrastructure inadequacies and a sender-side solution", IEEE Network, vol. 14 No. 3, Jul. 1, 2000; pp. 30-37 NY.

Crispin, M.: "Interactive mail access protocol—version 2" Network Working Group; Jul. 1988.

Theodoloz, N.: "DHT-based routing and discover in JXTA" Diploma Project, Ecole polytechnique federale de Lausanne, Switzerland; Feb. 2004; pp. 1-126.

* cited by examiner

METHOD AND APPARATUS FOR MANAGING VOICEMAIL IN A COMMUNICATION SESSION

CROSS REFERENCE

This application includes subject matter that is related to and claims priority from U.S. Pat. No. 8,681,948 issued on Mar. 25, 2014.

FIELD

The specification relates generally to voicemail systems and specifically to a method and apparatus for managing voicemail in a communication session.

BACKGROUND

Voicemail storage in traditional communication and collaboration systems is often provided by a dedicated voicemail server. Such servers serve many users and, as a result, are provided with large amounts of non-volatile memory and signal processing equipment. As such, these servers are expensive and their expense leads to issues of affordability in the scaling of communication and collaboration systems, for example in installations in the SOHO (small office—home office), small business and large enterprise branch markets. Several issues are related to the expense of such systems.

One factor relating to the costliness of such systems is a need to provide a sufficient degree of resiliency in the storage of voicemails. For example, for users who are affected by Sarbanes-Oxley and/or by litigation, loss of voicemails could have serious legal consequences. Traditional methods of resiliency for voicemails require duplicated storage possibly on separate servers, which leads to increased use of resources and expense.

Another major issue to some systems is voicemail SPAM. Large amounts of SPAM can be sent for a trivial cost to the sender but with large costs in storage and handling being borne by the receiver. This is especially true for voice and multimedia SPAM because of the large size of the files that need to be stored.

Several solutions have been used to address the issue of the scalability for voicemail systems to small installation sizes. By far the most commonly used is the provision of a network (possibly hosted) server that can serve a large number of installations. The cost of an extra server is undesirable for small installations. As well, a hosted server can be unattractive due to the potential of high prices, low reliability and indifferent customer service.

Voicemail can also be stored at the receiving telephone device, however, such local storage has several disadvantages. For example, memory is not a trivial expense and commercially, end user devices are cost sensitive. Further some end points can receive far more voicemail than others, depending on the amount of memory provided. Hence, for economy, each telephone device will have to be sized for the worst case unless special options or devices are offered for heavy voicemail users. Commercially this adds cost to a product line.

BRIEF DESCRIPTIONS OF THE DRAWINGS

Embodiments are described with reference to the following figures, in which.

DETAILED DESCRIPTION OF THE EMBODIMENTS

Figure 1:
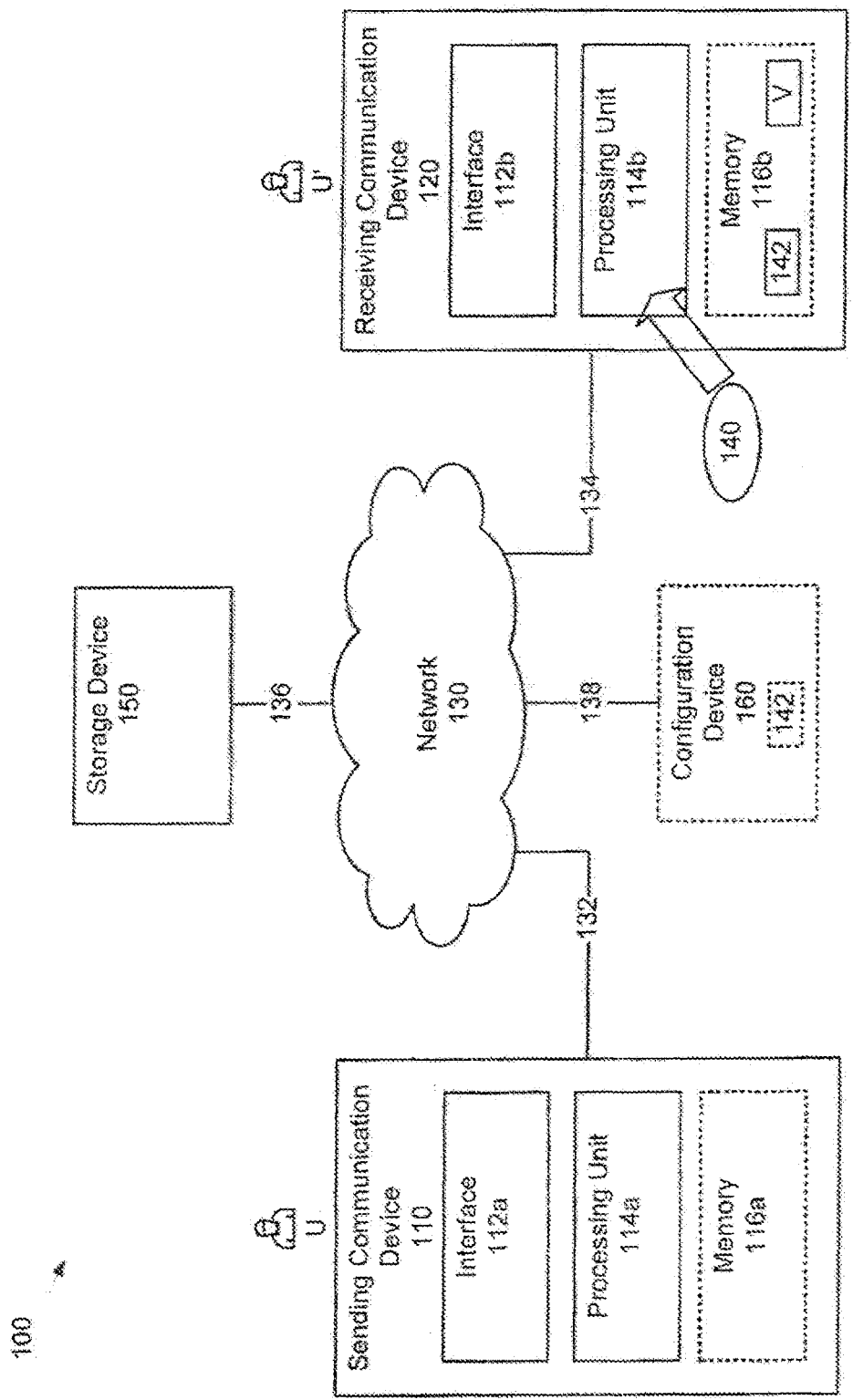
FIG. 1 depicts a system for managing voicemail, according to a non-limiting embodiment.

FIG. 1 depicts a system 100 for managing voicemail. System 100 comprises a sending communication device 110 that is being operated by a user U. Sending communication device 110 is generally enabled to establish a communications session with a receiving communications device 120 via a network 130, the receiving communications device 120 being associated with a user U'. The user U' may or may not be operating the receiving communications device 120.

Sending communication device 110 is any type of communications device that can establish a communications session with the receiving communications device 120, and accept voice input from the user U, such that the voice input is provided to resources associated with the receiving communication device 120 via the sending communication device 110 in order to leave a voicemail for the user U', in the event the user U is not available to communicate in the communications session. Thus, sending communication device 110 can be, for example, a desktop or laptop computer enabled with input and output devices for receiving and relaying voice data to the user U, a telephone (PSTN or VoIP based), and a cellular telephone, and/or a combination thereof. Sending communication device 110 connects with network 130 via a link 132. Link 132 can be wired or wireless or combinations thereof. Link 132 is complementary to a network interface 112*a* in sending communication device 110.

As one example, where sending communication device 110 is a desktop or laptop computer, and link 132 is wired, then link 132 can be an Ethernet link, a digital subscriber line ("DSL") link, a cable-Internet link, a fibre-optic link and/or combinations thereof.

As another example, where sending communication device 110 is a cellular telephone, and link 132 is wireless, then link 132 can be, for example, based on the global system for mobile communications ("GSM"), or Code Division Multiple Access ("CDMA") and/or IEEE 802.11g (and its variants) and/or WiMAX and/or combinations and variants thereof.

Network 130, in turn, is interoperable with link 132 and able to communicate there over. Network 130 can be, for example, the Internet, the Public Switched Telephone Network ("PSTN"), an Intranet, a local area network and/or combinations thereof.

Hence, the configuration of network 130 is not particularly limited and can be based upon any combination of known or still un-conceived network infrastructure(s) and elements that permit users to communicate via the sending communication device 110 and the receiving communication device 120, and otherwise interact from remote locations via telecommunication devices.

Receiving communication device 120 can be similar to the sending communication device 110. Receiving communication device 120 connects to network 130 via link 134. Like link 132, link 134 can be wired or wireless or combinations thereof, and is complementary to a network interface 112*b* in receiving communication device 120. The network interface 112*b* can be similar to the network interface 112*a* (generically referred to as a network interface 112 and collectively as network interfaces 112).

At least one of the sending communication device 110 and the receiving communication device 120 comprises a processing unit 114*a* or 114*b*, respectively (generically referred to as a processing unit 114 and collectively as processing units 114). In particular the processing unit 114*b* is enabled for executing an application 140 for managing voicemail, as depicted in FIG. 1. The application 140 can be stored in a memory 116*b* prior to execution by the processing unit 114*b*. The memory 116*b* can be further enabled to store at least one of a policy 142 for managing voicemails, for example a voicemail V.

In some embodiments, the sending communication device 110 further comprises a memory 116*a*, enabled to store voicemails.

In some embodiments, the system 100 further comprises at least one storage device 150, remote to the sending communication device 110 and the receiving communication device 120. The remote storage device 150 is generally associated with the sending communication device 110, and is enabled to store voicemails. The remote storage device 150 connects to the sending communication device 110 via a link 136. Again, the implementation of link 136 is not particularly limited and merely need provide connectivity between respective components.

The storage device 150 is associated with the sending communication device 110, such that the storage device 150 stores voicemails on behalf of the sending communication device 110. However, voicemails stored at the storage device 150 can be retrieved by the receiving communication device 120, for example when requested by the user U. While in a present embodiment, only one storage device 150 is shown, it should be understood that in other embodiments multiple storage devices 150 can be employed.

In other embodiments, the system 100 further comprises at least one configuration device 160, which can be remote to at least one of the sending communication device 110 and the receiving communication device 120. If present, the configuration device 160 is enabled to store configuration data, such as the policy 142 and connects to the receiving communication device 120 via a link 138. Again, the implementation of link 138 is not particularly limited and merely need provide connectivity between respective components. While in a present embodiment, only one configuration device 160 is shown, it should be understood that in other embodiments multiple configuration devices 160 can be employed.

Figure 2:
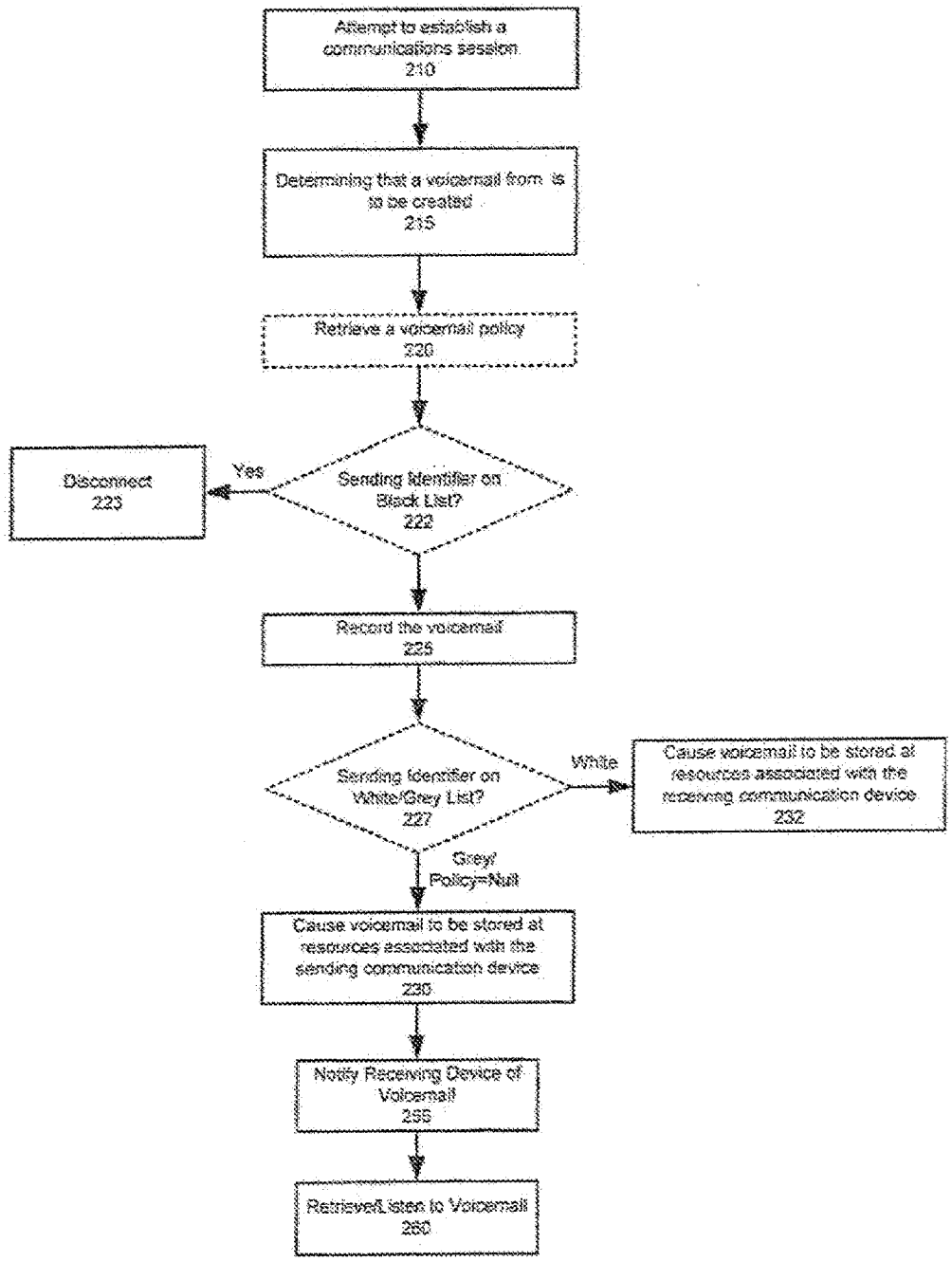
FIG. 2 depicts a method for managing voicemail, according to a non-limiting embodiment.

Attention is now directed to FIG. 2 which depicts a method for managing voicemail. In order to assist in the explanation of the method, it will be assumed that the method is performed using the system 100, for example via the processing unit 114*b* processing the application 140. Furthermore, the following discussion of the method will lead to a further understanding of the system 100 and its various components. However, it is to be understood that the system 100 and/or the method can be varied, and need not work exactly as discussed herein in conjunction with each other, and that such variations are within the scope of present embodiments.

Figure 3:
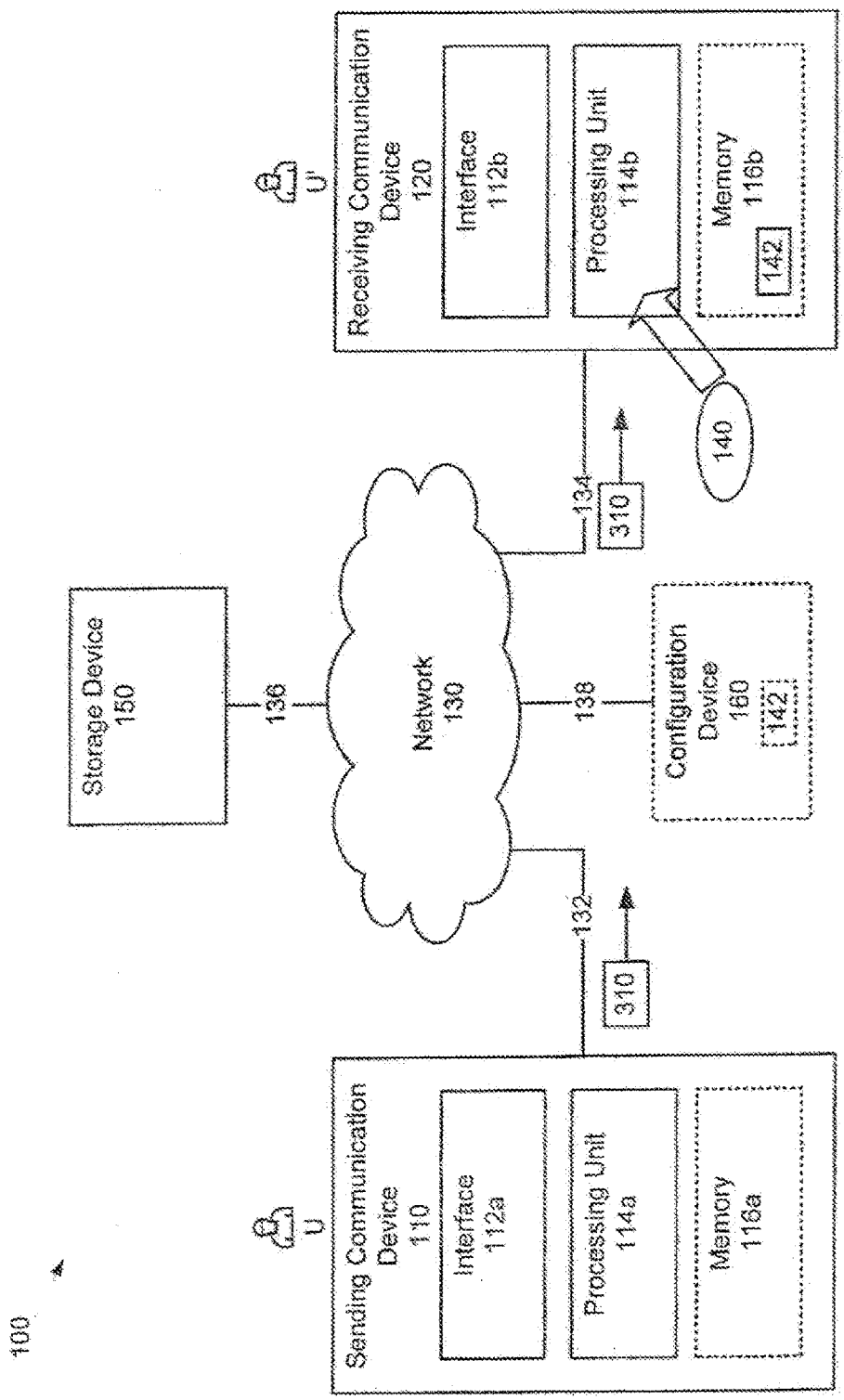
FIGS. 3 to 7 depict systems for managing voicemail, according to non-limiting embodiments.

The method begins at step 210. At step 210, an attempt to establish a communications session between the sending communication device 110 and the receiving communication device 120 occurs. For example, as depicted in FIG. 3, the sending communication device 110 can transmit a request 310 for a communication session to the receiving communication device 120. The request 310 can comprise a packet based request, such as a SIP request, or a PSTN based request. In other words, the user U attempts to call the user U' using the sending communication device 110.

In any event, the request 310 is delivered to the receiving communication device 120 by the network 130. In some embodiments, the request 310 can be modified by the network 130 prior to delivery: for example in PSTN based embodiments, the request 310 can be processed by a switch within the network 130 such that a direct connection is established between the sending and receiving communication devices 110 and 120. The receiving device 120 generally attempts to notify the user U' that the request 310 has been received, via an audio signal, a visual signal and/or vibration, as known to persons of skill in the art (e.g. the receiving communication device 120 rings).

In the event that the user U" does not respond to the request 310 (i.e. the user U' does not respond to the audio/visual/vibratory signal), either because the user U' is not in the vicinity of the receiving communication device 120 or because the user U' chooses not to respond, it is determined at step 215, that a voicemail is to be created, the voicemail based on content received via the sending communication device 110. For example, it can be determined that a voicemail option is to be provided to the sending communication device 110 if the request 310 is not responded to within a given length of time and/or a given number of rings.

In general, the request 310 comprises an identifier of the sending communication device 110, including but not limited to an IP address, a MAC address, a phone number, an identifier of the user U, and/or a SIP identifier. In some embodiments, the request 310 comprises a calling line identifier (CLID), at least when the request 310 is delivered to the receiving communication device 110.

Up TO step 215, the method has proceeded according to the prior art. However, at an optional step 220 the policy 142 for storing voicemail is retrieved, in response to the determination that a voicemail from the sending communication device 110 is to be created. In some embodiments, the policy 142 is retrieved from the memory 116*b*, while in other embodiments the policy 142 is retrieved from the configuration device 160. In any event, the policy 142 comprises information on how voicemails are to be managed.

For example, in some embodiments, the policy 142 can comprise a white list of identifiers of sending communication devices (including but not limited to identifiers of users respectively associated with sending communication devices) for which it is authorized to create and/or store voicemails at resources associated with the receiving communication device 120, such that storing the voicemail occurs at resources associated with the receiving communication device 120. Hence, if the identifier of the sending communication device 110 (as identified in the request 310) is in the white list, the sending communication device 110 is authorized to leave voicemails at the receiving communication device 110, for example in the memory 116*b* and/or other resources associated with the receiving communication device 120. Other resources can include, but are not limited to, a remote storage device, similar to the remote storage device 150, but associated with the receiving communication device 120. In other words, sending communication devices (or users) on the white list are authorized to use resources associated with the receiving communication device 120.

In other embodiments, the policy 142 can comprise a black list of identifiers of sending communication devices for which voicemails are not authorized to be created. Hence, if the identifier of the sending communication device 110 (as identified in the request 310) is in the black list, the sending communication device 110 is forbidden to leave voicemails at the receiving communication device 110 under any circumstances. Indeed, if it is determined that the identifier of the sending communication device 110 is on the black list, the receiving communication device 120 simply disconnects from the communication session and no further action is taken. For example, the black list can comprise identifiers of known spammers and the receiving communication device 120 then hangs up on known spammers.

In yet another embodiment, the policy 142 can comprise a grey list of identifiers of sending communication devices for which it is authorized to create voicemails, but wherein storing the voicemail occurs at resources associated with the sending communication device 110, for example in the memory 116a and/or the storage device 150, as will be described below.

In some embodiments, the policy 142 comprises any desired combination of a white list, a black list and a grey list. Table I shows exemplary contents of the policy 142, in a specific non-limiting embodiment:

TABLE I

Non-limiting Example of a Policy 142

| Entry | White List | Black List | Grey List |
| --- | --- | --- | --- |
| 1 | Bob Smith | John Cooper | 416-555-1215 |
| 2 | 905-555-1212 | 212-555-1213 | Jane Kennedy |
| 3 | 905-555-1214 | 192.168.255.254 | 00-08-74-4C-7F-1D |
| 4 | 192.168.255.255 | 192.168.255.240-192.168.255.253 | |
| 5 | 00-08-74-4C-7F-1A | | |

Explaining Table I in greater detail, Table I comprises 4 columns: an "Entry" number column, and a White List, a Black List and a Grey List. Entries 1-5 of the White List comprise a user name, two phone numbers, an IP address, and a MAC address, each of which are an identifier of a sending communication device and/or an identifier of a user which are authorized to use resources associated with the receiving communication device 120. Entries 1-3 of the Black List comprise a user name, a phone number and an IP address, each of which are an identifier of a sending communication device and/or an identifier of a user which are not authorized to use resources associated with the receiving communication device 120. Further Entry 4 comprises a range of IP addresses identifying sending communication devices which are which are not authorized to use resources associated with the receiving communication device 120. Entries 1-3 of the Grey List comprise a phone number, a name and a MAC address, each of which are an identifier of a sending communication device and/or an identifier of a user which are not authorized to use resources associated with the receiving communication device 120. The White, Black and Grey Lists need not contain the same number of entries. Furthermore, each entry in a given list is independent of the other entries, and some entries can be redundant: for example, a user/sending communication device can be identified in a list more than once (e.g. by a user name and/or a phone number, etc.). However, the number of entries in a given list, the format of each list, and the format of each entry is generally non-limiting.

The white, black, and/or grey lists can be managed centrally by a system manager and/or by the user U'. Central lists could be supplied by a system manager (human or otherwise) which could be kept up to date with known SPAM addresses on a continuing basis. Graphic User Interfaces (GUIs), Telephone User Interfaces (TUIs) or other user interfaces could be provided that would allow a user to add specific addresses (including the address of a current call or a call from a call history list) to one of these lists.

In some embodiments, however the policy 142 can comprise a null policy, the null policy indicative that the voicemail to be stored at resources associated with the sending communication device 110 under all circumstances. In other words, there is no specific list of identifiers of sending communication devices; rather the receiving communication device 120 automatically causes the voicemail to be stored at resources associated with the sending communication device 110 under all circumstances.

Further, the policy 142 can comprise an indication of where a recording of a voicemail is to be made. For example, in some embodiments, the recording of a voicemail is to be made at the resource where the voicemail is to be stored (e.g. according to the White List, Black List and/or Grey List), while in other embodiments, the recording of the voicemail is to be made at a given resource, and then later transmitted to a resource where the voicemail is to be stored. Furthermore, each of the entries of the policy 142 (e.g. as in Table I), can be associated with a different recording resource. In some embodiments, the policy 142 comprises a default resource which will record the voicemail in the absence of additional information within an entry.

At optional step 222, which is implemented if the voicemail policy is retrieved at step 220, it is determined if the identifier of the sending communication device 110 is on the black list. If so, the receiving communication device 120 disconnects at step 223.

Alternatively, if the sending communication device 110 is identified by blocked caller ID information, the identifier of the sending communication device 110 can be treated as if the identifier is on the black list.

Otherwise, at step 225, the voicemail V is created by prompting the user U to leave a voicemail, and subsequently recording his/her message by receiving voice data input via the sending communication device 110. In general, in some embodiments, the sending communication device 110 is not aware that a voicemail is being recorded: rather, the voice data input is conveyed to the receiving communication device 120 as with any voice data input during the communication session. Step 225 can occur according to the policy 142, such that a resource indicated within the policy 142 performs the recording. However, in some embodiments, it is understood that in the absence of such an indication, the recording is performed according to a default resource (such as the receiving communication device 120), which can or can not be stored within the policy 142. An identifier of the default resource can be stored separately within the memory 116b and/or at the configuration device 160.

If the recording of the voicemail V proceeds at a remote storage device, then the communication session is adjusted appropriately, either by bridging the remote storage device into the communication session or redirecting the communication session to the remote storage device.

Figure 4:
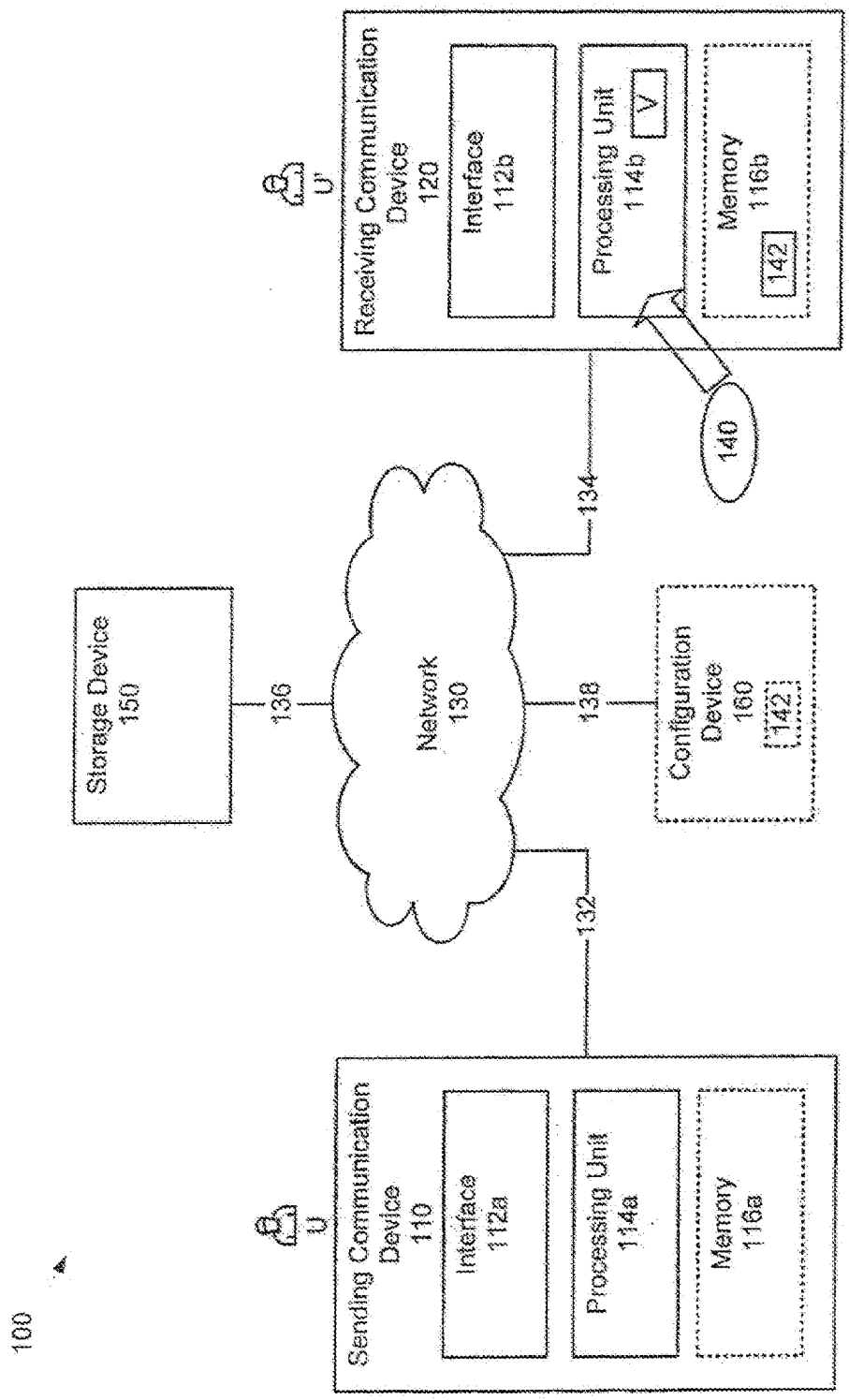

In some exemplary embodiments, as illustrated in FIG. 4, the voicemail V is recorded at the processing unit 114b at step 225.

Figure 5:
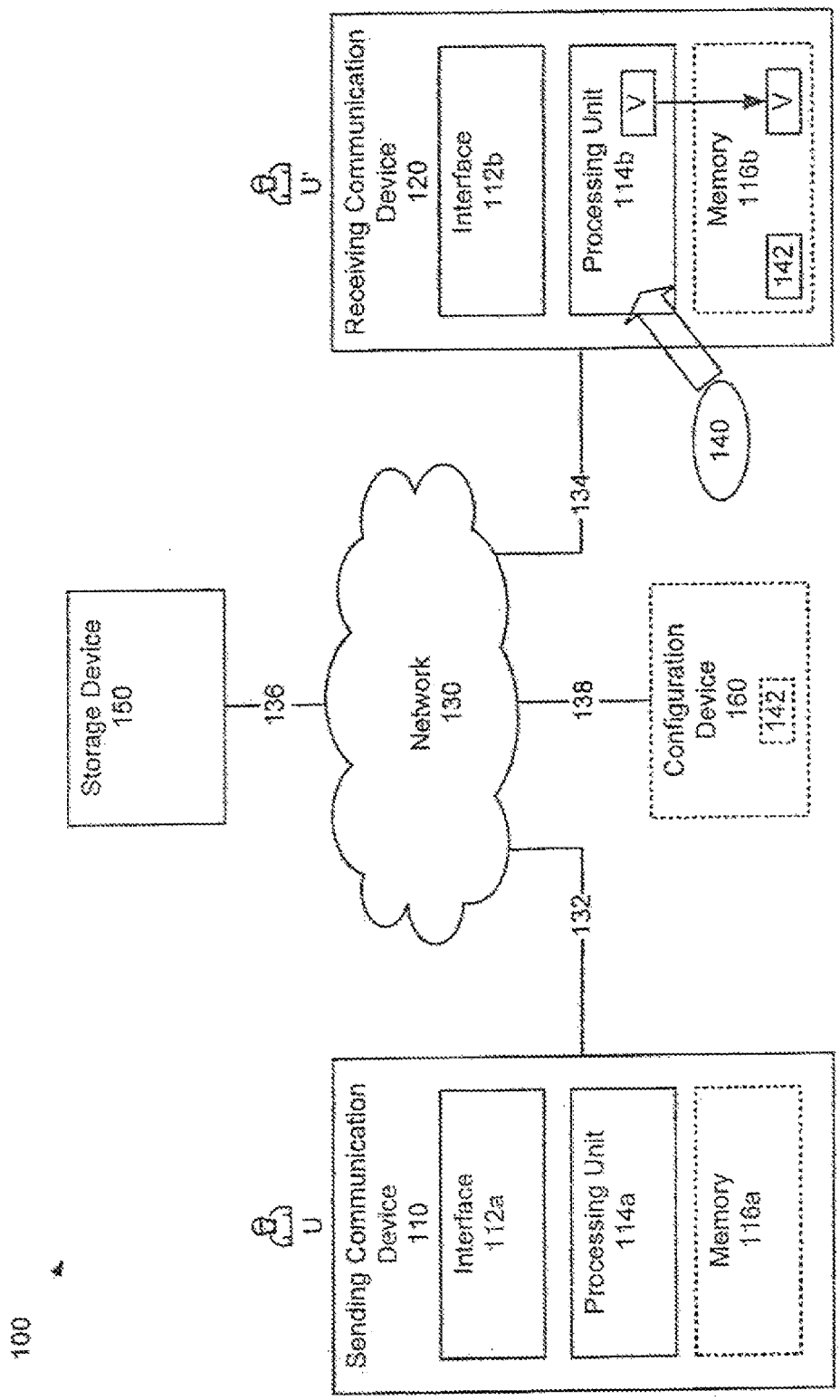

At optional step 227, which is implemented if the voicemail policy is retrieved at step 220, it is determined if the identifier of the sending communication device 110 is on the white or grey lists. If the identifier of the sending communication device 110 is on the white list, at step 232 the voicemail V is stored at resources associated with the receiving communication device 120, such as the memory 116b, as depicted in FIG. 5. Alternatively, the voicemail V can be recorded and/or stored at a remote storage device, as described above. In some embodiments, the voicemail can be stored according to a resiliency policy 842 as described below (e.g. see FIGS. 8 and 9).

Figure 6:
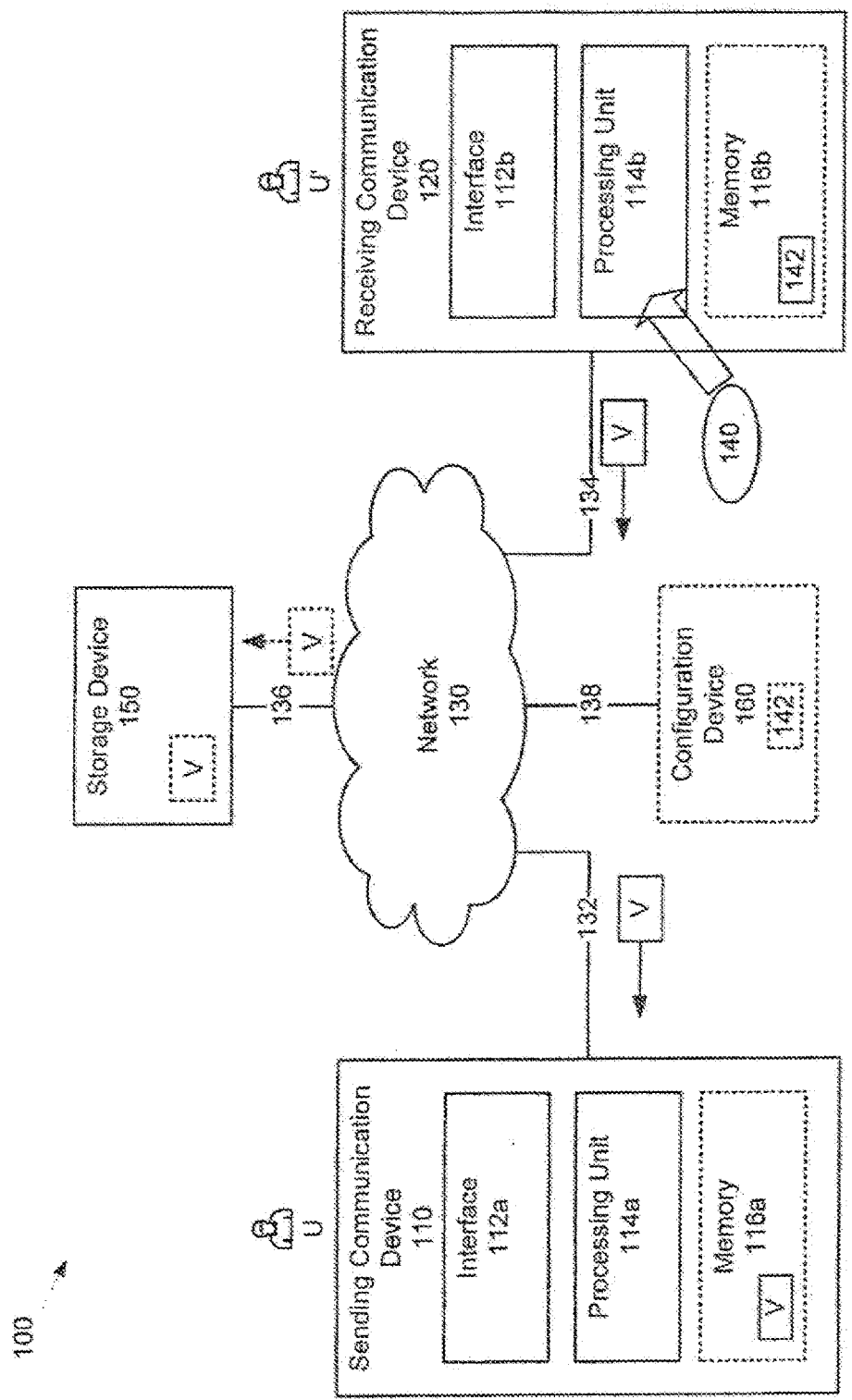

However, if the identifier of the sending communication device 110 is on the grey list, at step 230 the voicemail V is stored at resources associated with the sending communication device 110. Step 232 will alternatively occur if the policy 142 comprises a null policy (e.g. in the absence of a white/black/grey list). For example, as illustrated in FIG. 6, the voicemail V is transmitted to the sending communication device 110 for storage, for example, using the identifier present in the request 310. The processing unit 114a is enabled to determine where the voicemail is to be stored, specifically at a resource associated with the sending communication 110. In some embodiments, the voicemail V is subsequently stored in the memory 116a. In other embodiments, the sending communication device 110 causes the voicemail V to be transmitted to the storage device 150, assuming that at least a portion of the storage device 150 is dedicated to storing voicemail on behalf of the sending communication device 110. In other embodiments, the sending communication device 110 can further transmit the voicemail V to another storage device dedicated to storing voicemail on behalf of the sending communication device 110. In yet further embodiments, the voicemail V can be stored in a plurality of locations, including but not limited to the memory 116a and the storage device 150.

In some embodiments, if the sending communication device 110 is identified by blocked caller ID information, the identifier of the sending communication device 110 can be treated as if the identifier is on the grey list.

Figure 7:
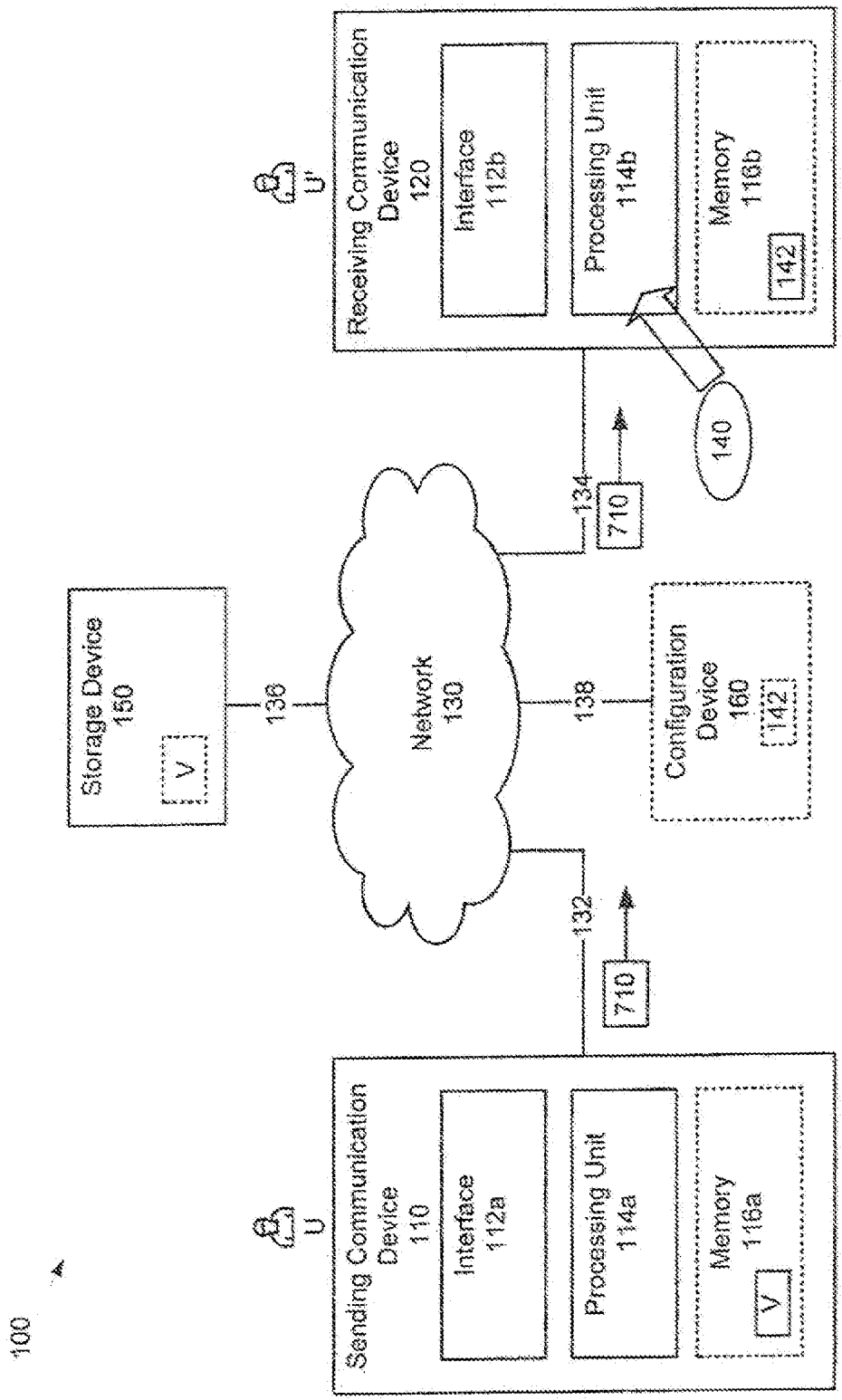

Once the voicemail V is recorded and stored, the receiving communication device 120 can be generally notified, at step 255, as to how to retrieve the voicemail V. For example, as in FIG. 7, the sending communication device 110 and/or the storage device 150 transmits a notification 710 to the receiving communication device 120, the notification 710 comprising data which enables the receiving communication device 120 to retrieve and/or listen to the voicemail V at step 260. In some embodiments, retrieving the voicemail V can comprise retrieving a copy of the voicemail V, for example by requesting it from the sending communication device 110 and/or the storage device 150. Such a retrieval can be triggered by the user U' interacting with the receiving communication device 120, and can occur when the user U' desires a copy of the voicemail V. However, in other embodiments, retrieving the voicemail V can comprise the user U' initiating a communication session with the sending communication device 110 and/or the storage device 150, via the receiving communication device 120 or any other suitable communication device, and listening to the voicemail V without actually retrieving a copy. The user U' can then cause the voicemail V to be deleted from the memory 116a and/or the storage device 150, or simply leave it with a decision as to when to delete to be made by the user U and/or the sending communication device 110 and/or the storage device 150. For example, the voicemail V can be deleted once it is retrieved and/or listened to, or after a given time period.

Figure 8:
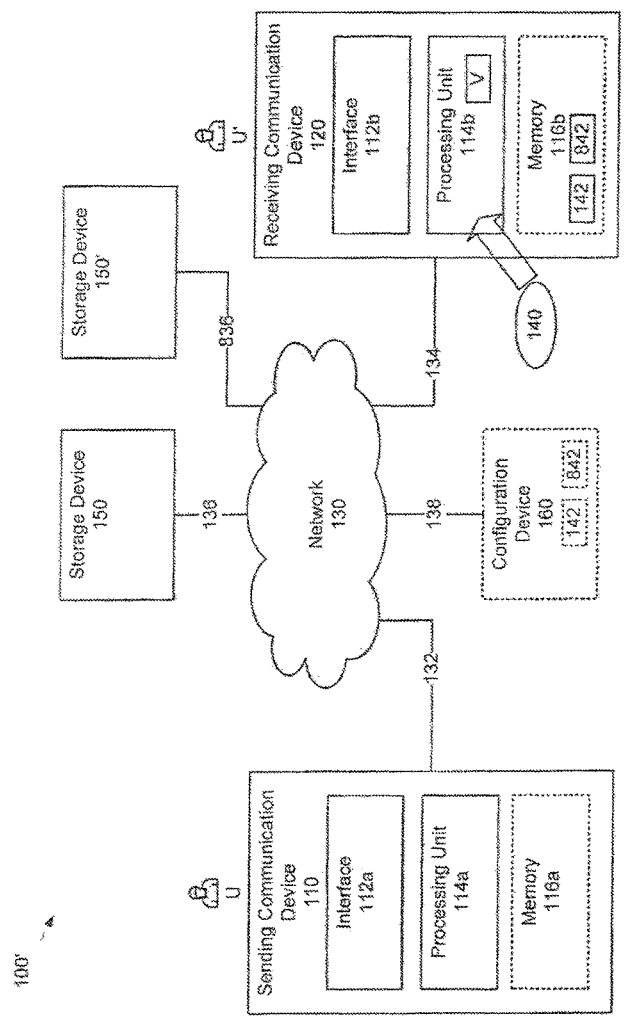
FIG. 8 depicts a system for storing voicemail according to a resiliency policy, according to a non-limiting embodiment.
Figure 9:
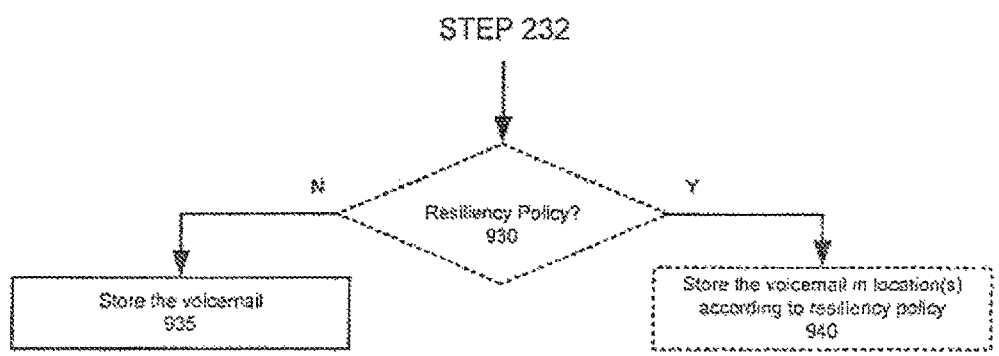
FIG. 9 depicts a method for storing voicemail according to a resiliency policy, according to a non-limiting embodiment.

Attention is now directed to FIG. 8, which depicts a system 100', similar to the system 100, with like elements having like numbers. However, the system 100' comprises at least one remote storage device 150', similar to the remote storage device 150; however the storage device 150 is associated with the receiving communication device 120. The remote storage device 150' connects to the receiving communication device 120 via a link 836. Again, the implementation of link 836 is not particularly limited and merely need provide connectivity between respective components.

The system 100' further comprises a resiliency policy 842, either stored in the memory 116b and/or stored at the configuration device 160. The resiliency policy 842 comprises a list of resources where the voicemail is to be stored, such that the voicemail is stored in more than one location, which can include but is not limited to the number of copies of the voicemail V which are to be stored, as well as identifiers of the locations where the voicemail V is to be stored. The resiliency policy 842 is generally applied by the receiving communication device 120. Table II shows exemplary contents of the resiliency policy 842, in a specific non-limiting embodiment:

TABLE II

| Non-limiting Example of a Resiliency Policy 842 | |
|---|---|
| Number of Copies | 2 |
| Location 1 | Receiving Communication Device 120 |
| Location 2 | Storage Device 150' |

Explaining Table II in greater detail, the number of copies of the voicemail V which are to be stored are two (2), and the copies are to be stored at the receiving communications device 120 and the storage device 150. Table II, can also comprise a network identifier of each of the Locations and/or memory element at each of the locations where the voicemail V is to be stored. Further, it is understood that the resiliency policy 842 is to be applied only if the sending communication device 110 (and/or the user U) is on the white list (or in some embodiments, on the grey list), such that only voicemails from sending communication devices (and/or users) which are authorized to use resources associated with the receiving communication device 120 are stored according to the resiliency policy 842.

In some embodiments, the resiliency policy 842 can comprise a single location that is different from the receiving communication device 120. However, in some of these embodiments, it can be understood that a copy of the voicemail V is nonetheless always to be stored at the receiving communication device 120.

In some embodiments, the policy 142 can comprise the resiliency policy 842.

It will be recalled that if the identifier of the sending communication device 110 is on the white list, at step 232 the voicemail V is stored at resources associated with the receiving communication device 120 and that in some embodiments, the voicemail can be stored according to the resiliency policy 842. Attention is hence directed to FIG. 9, which depicts a method for storing the voicemail according to the resiliency policy 842. Specifically, step 232 from the method can proceed in embodiments where the method is performed via system 100'. Alternatively, in some embodiments, the resiliency policy 842 can be applied if the identifier of the sending communication device 110 is on the grey list and/or if the policy 142 comprises a null policy. Hence the voicemail V can be both transmitted to the sending communication device 110, as in FIG. 6, and stored at resources associated with the receiving communication device 120, as indicated within the resiliency policy 842: i.e. in some embodiments, step 230 can also comprise the method of FIG. 9. Data indicating whether or not to implement the resiliency policy 842 can be stored within the resiliency policy 842 and/or the policy 142. In some embodiments, the resiliency policy 842 can be universally applied for all sending communication devices with identifiers on the white and/or grey lists. In other embodiments, the resiliency policy 842 can be applied for some sending communication devices and not others: e.g. an indicator can be stored in association with identifiers in the white and/or grey lists, the indicator indication whether the resiliency policy 842 is to be applied.

At step 930 it is determined if the resiliency policy 842 is present and/or whether the resiliency policy 842 is to be applied (e.g. whether the identifier of the sending communication device 110 is on the white and/or grey lists, and/or whether the indicator is present in association with the identifier, the indicator indicating that the resiliency policy 842 is to be applied). If the resiliency policy 842 is not present or is not to be applied, at step 935, the voicemail V is stored according to step 230 or step 232, as described above.

Figure 10:
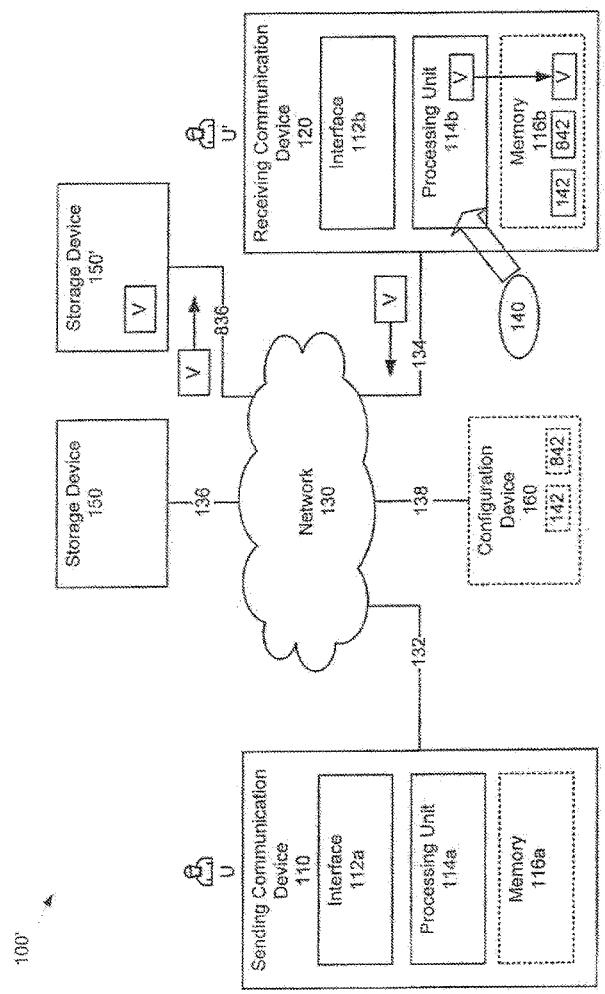
FIG. 10 depicts a system for storing voicemail according to a resiliency policy, according to a non-limiting embodiment.

However, if the resiliency policy 842 is present (and is to be applied), at step 940, the voicemail V is stored in locations according to the resiliency policy 842. For example, as in FIG. 10, the resiliency policy 842 of Table II is applied, and the voicemail V is stored in the memory 116b, and also transmitted to the storage device 150' for storage. The voicemail V can be retrieved from the remote storage device 150' as desired, and managed by the user and/or an administrator of the system 100', as desired. Hence copies of voicemails are automatically stored, which can be required for regulatory purposes (e.g. due to a regulatory body and/or general company regulations).

Hence, in some embodiments, by applying the resiliency policy 842 after determining whether the identifier of the sending communication device 110 is on the black list (and/or identified as blocked caller ID), application of the resiliency policy 842 to spam is eliminated.

In embodiments that utilise the SIP protocol, the sending communication device 110 can be notified of a policy decision (e.g. where to record the voicemail V, where to store the voicemail V, and implementation of resiliency) via SIP INFO messages to convey the request for the desired behaviour. A one way audio path would then be created so that the voicemail announcement message from the receiving communication device 120 can be sent to the sending communication device 110 for temporary use. This negotiation could be initiated either by the sender or the receiver with a re-INVITE message after the INFO message is sent. A two-way data path can also be negotiated (or SIP INFO messages used) to send to the sending communication device 110 the degree of resiliency that is required by the resiliency policy 842. This can be an integer denoting the number of independent copies that are to be stored The sending communication device 110 can be generally responsible for identifying suitable locations for storage. The receiving communication device 120 directs the sending communication device 110 to store the voicemails with the specified resiliency but will have no knowledge of where these are stored until it receives the notification from the sending communication device 110.

The sending communication device 110 will then interact with the user U to obtain a voicemail message content that is satisfactory to the user U, hence creating the voicemail V. The sending communication device 110 will then store the voicemail V on a number of storage devices, such as storage device 150, so as to provide the requested degree of resiliency. In some embodiments, to obtain the addresses of the storage devices on which to store the voicemail V, the sending communication device 110 can consult a managing device such as configuration device 160, which maintains a list of eligible servers.

The sending communication device 110 will then place the voicemail V on the selected storage device(s), e.g. by transmitting the voicemail V. The voicemail V will be stored. The sending communication device 110 can use a number of methods to place voicemail V onto the remote storage device(s) including but not limited to a SIP PUBLISH method or an HTTP POST message. The sending communication device 110 can then supply the receiving communication device 120 with an identifier for the voicemail V. For security reasons the identifier can be constructed cryptographically from the voicemail content by an MD5 hash or other technique, such that a request to access the voicemail V can be verified as coming from a legitimate party. Use of cryptographic techniques can also provide a means for detecting tampering with the voicemail V. Finally the sending communication device 110 can send to the receiving communication device 120, the address information for the chosen storage device(s) along with other information such as the identifier. This information is generally sufficient for the user to manage his/her voicemail list and to retrieve voicemails via a TUI and/or GUI at the receiving communication device 120.

Figure 11:
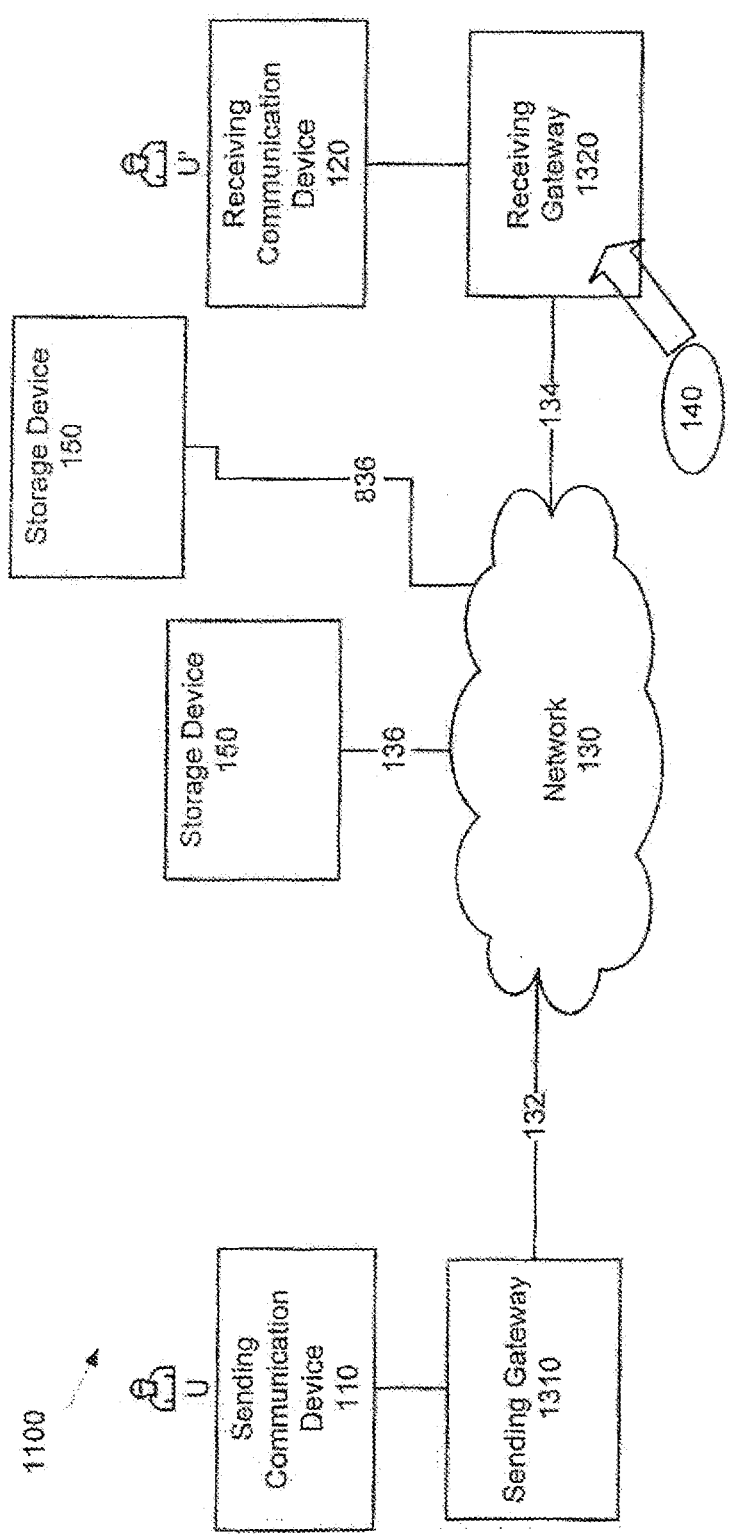
FIGS. 11 and 12 depict systems for managing voicemail, according to a non-limiting embodiment.

Attention is now directed to FIG. 11, which depicts a system 1100 for managing voicemail, according to a non-limiting alternative embodiment. The system 1100 is substantially similar to the system 100 and/or the system 100', except that at least one of the sending communication device 110 and the receiving communication device 120 is in communication with the network 130 via a gateway device, such as the sending gateway 1310 and receiving gateway 1320, respectively. Furthermore, the application 140 is implemented within the receiving gateway 1320. In some embodiments, the sending gateway 1310 and/or the receiving gateway 1320 comprises at least one of a PSTN gateway, a NAT gateway, and a firewall gateway. Furthermore, in other embodiments, the sending gateway 1310 and/or receiving gateway 1320 can be enabled to store voicemail.

Figure 12:
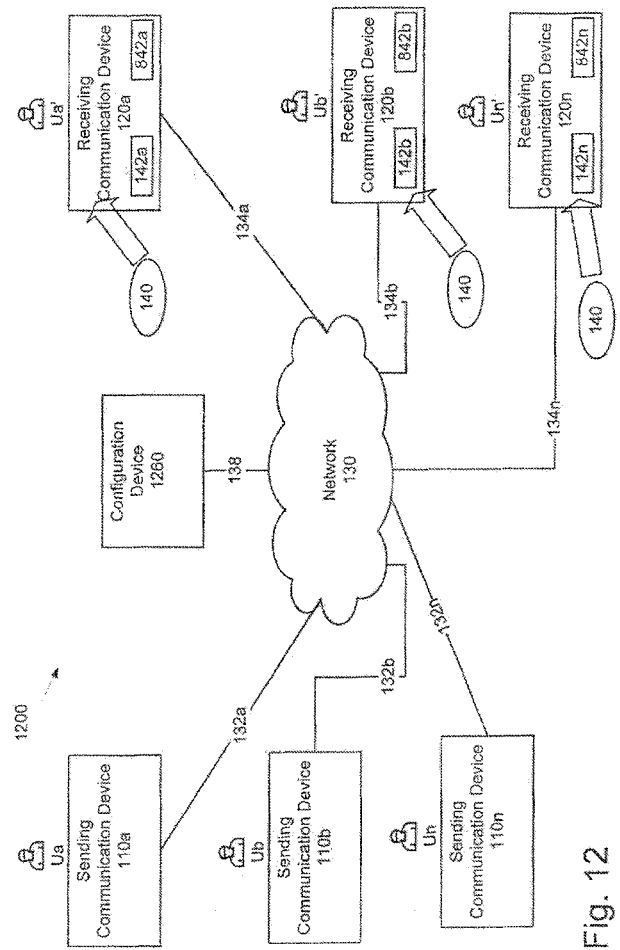

Attention is now directed to FIG. 12, which depicts a system 1200 for managing voicemail, according to a non-limiting alternative embodiment. The system 1200 is substantially similar to the system 100 and/or the system 100', except that the system 1200 comprises more than one sending communication device 110a, 110b . . . 110n, each substantially similar to the sending communication device 110, and more than one receiving device 120a, 120b . . . 120n, each substantially similar to the receiving communication device 120. In these embodiments, each receiving communication device 110a, 110b . . . 110n comprises their own policy, 142a, 142b . . . 142n, respectively, and their own resiliency policy 842a, 842b . . . 842n, respectively. In an alternative embodiment, each of the policies 142a, 142b . . . 142n, and/or the resiliency policies 842a, 842b . . . 842n can be stored at a configuration device 1260 and retrieved by each receiving communication device 120 as required. Furthermore, each of the policies can be centrally managed and/or configured by an administrator of the system 1200 and/or by each individual user. While the system 1200 is depicted with only one configuration device 1260, it is understood that more than one configuration device can be present. Furthermore, the configuration device 1260 can be remote or local to the receiving communication devices 120, for example as an element of a second LAN.

In some embodiments that are centrally managed, each receiving communication device 120, as desired, is enabled to retrieve the policies from the appropriate configuration device.

Returning to FIG. 3, various protocols can be used to negotiate a communication session, including but not limited to a SIP protocol, a P2P protocol, an IP protocol, and a PSTN protocol. Further these same protocols can be used to negotiate where storing said voicemail is to occur, based on the policy 142.

In embodiments where SIP protocols are used to negotiate a communication session between the sending communication device 110 and the receiving communication device 120 (e.g. where the request 310 comprises a SIP invite), negotiation of the storage mode can proceed in manner similar to a SIP negotiation of a held connection. For example, SIP uses SDP (Session Description Protocol, as described in RFC2321 from the Network Working Group) to negotiate media paths. For a held connection, SIP will use a re-Invite method to negotiate a one way audio path from the held to the holding party. The one way path allows music to be played to the held party while conserving network bandwidth by eliminating the unneeded media path in the other direction.

Hence, SDP provides the capability of negotiating a one way path by providing a number of attributes that indicate the connection desired. These are provided in the attribute line "a=" that can be supplied to describe a desired path. RFC2321 gives many examples of standardized attributes that can be used to describe the media path. Using SIP, media connections used for embodiments where the sending communication device 110 stores the voicemail V, can utilize the "a=" attribute described within RFC2321, to enable their description during negotiation. For example:

"a=recvonly" This specifies that tools/applications for managing voicemail (e.g. applications 140), as well as tools/applications for managing communications should be started in receive-only mode where applicable. It can be either a session or media attribute, and is not dependent on charset.

"a=sendrecv" This specifies that tools/applications for managing voicemail and/or communications should be started in send and receive mode. This is necessary for interactive conferences tools which default to receive only mode. It can be either a session or media attribute, and is not dependent on charset.

"a=sendonly" This specifies that tools/applications for managing voicemail and/or communications should be started in send-only mode. A non-limiting example is where a different unicast address is to be used for a traffic destination than for a traffic source. In such a case, two media descriptions can be used, one "a=sendonly" and one "a=recvonly". It can be either a session or media attribute, but would normally only be used as a media attribute, and is not dependent on charset.

"a=type:<conference type>" This specifies a type of conference. Suggested values are 'broadcast', 'meeting', 'moderated', 'test' and 'H332'. 'recvonly' can be the default for 'type:broadcast' sessions, 'type:meeting' can imply 'sendrecv' and 'type:moderated' can indicate the use of a floor control tool and that the media tools are started so as to "mute" new sites joining the conference.

In embodiments where the sending communication device 110 stores the voicemail V, a path is established where the sending communication device 110 can receive audio data from the receiving communication device 120. A local storage path can also be established. To indicate this, a new attribute called "rcvlocalstorage" can be defined. This can be used explicitly to indicate media direction as in "a=rcvlocalstorage" similar to the "a=sendonly" attribute, as known to a person of skill in the art, or as a new conference type as in "a=type:rcvlocalstorage".

As described above, the receiving communication device 120 will make a policy decision as to which type of voicemail storage will be offered. If the decision is for storage at the receiving communication device 120, then system operation will be as described above. However, if storage at the sending communication device 110 is decided upon, then the receiving communication device 120 indicates this choice to the sending communication device 110. As indicated above, a method for indicating that sending communication device 110 voicemail storage is desired is to use the attribute a:type:rcvlocalstorage in the SDP content during the negotiation.

If the sending communication device 110 accepts the offer of a:type:rcvlocalstorage, then sending communication device 110 storage will be performed as indicated above. However two alternative embodiments can exist. The sending communication device 110 can not be capable of performing local storage or it can refuse the option offered. In both of these cases, the receiving communication device 120 makes a further decision as to whether or not to extend another offer of receiver storage. Since, in some embodiments any device which refuses an offer of storage at the sending communication device 110 is a SPAM device, one alternative would be to immediately abandon the communication session.

In some embodiments, the described negotiation can occur after an initial SIP INVITE in which a sending communication device 110 makes an initial call to the receiving communication device 120. In this case, the receiving communication device 120 would be making responses to an initial offer from the sending communication device 110. However, there are embodiments in which the receiving communication device 120 would be sending the INVITE message and making the offer. This could occur as during the course of an existing call, one party can decide to offer the distant party the option of leaving a voicemail. This can be for the party's own voicemail box in which case a re-Invite would be issued. However, a user (such as an assistant) could offer to let a calling party leave a message in someone's voicemail box. In this case, the assistant's communication device could issue a SIP REFER message to that party's communication device, instructing it to issue a SIP INVITE to the distant party to leave a voicemail.

In another embodiment, a local party in a call could offer the distant party the option of leaving a message for him/her. That is the local party can offer the distant party an option of leaving a voicemail for the local party. In some embodiments, this will be stored by a resource associated with the distant party. In this case, the local party will send a re-INVITE with the SDP content indicating storage at the communication device of the distant party (e.g. the sending communication device 110).

In some non-limiting embodiments, the voicemail V has the following format:
  Identifier: cryptographic digest of content.
  Originator: Directory number or SIP URI of originator.
  Receiver: Directory number or SIP URI of originator.

Date: Time of Day of creation of voicemail.

Duration: Length of voicemail in seconds.

Urgency: Urgent or non-urgent.

Time to Live: a counter indicating how many minutes that a voicemail should be retained (a negative number indicates forever).

Contents: Content in compressed format.

However, other suitable formats of the voicemail V are within the scope of present embodiments.

Non-limiting methods of retrieving voicemail stored at a location remote from the receiving communication device 120 will now be described. It is assumed that the voicemail V is stored on at least one of the sending communication device 110 and the storage device 150.

As described above, the receiving communication device 120 obtains the address(es) of the device(s) on which voicemails are stored. Along with the address information, the receiving communication device 120 can receive a group of data that together will provide a unique identifier for the voice mail. This information can include, but is not limited to, the identity (directory number, SIP address, etc.) of the sending communication device 110, a time stamp, indicating when the voicemail V was stored and a cryptographically generated hash of the voicemail content. Taken together this information will be sufficient for the receiving communication device 120 to retrieve the voicemail V from the storing device(s). This will allow the receiving communication device 120 to obtain data from the storing device(s) in regard to each individual voicemail to generate a TUI (telephone user interface) or UI (for visual voicemail applications) so that the user U' can manage and recover his/her voicemails. Further, since the voicemail V can be stored on a plurality of storing devices, the receiving communication device 120 can attempt to recover the voicemail V from each of the storing devices, in turn, until successful.

Since, as described above, voicemails can be stored on both local storage devices and storage devices eternal to a local network (e.g. the receiving communication device 120 being a member of a LAN), a preference policy can be established on the ordering in which the storage devices holding the desired voicemail can be accessed. For example, since local storage devices will experience less delay and other impairments in the transmission of the voicemail, local devices can be given preference. Further, local devices can be more desirable than remote storage devices, since operators of commercial storage servers could charge a fee for recovery. Hence, such remote storage devices can be given less preference.

In retrieving voicemail from internal storage devices, such as storage devices within a LAN, there a number of techniques that can be used. In embodiments where data is initially retrieved to populate lists of available voicemails within a TUI or a GUI, the actual content of the voicemail V is not necessarily required. However, data that identifies the voicemail V, and further enables the receiving communication device 120 to retrieve the content of the voicemail V is generally retrieved. For the playing of the voicemail V, only the content of the voicemail V is required, but not necessarily any other data. In the case of management of the voicemail box, there will be a need for an instruction to remove the voicemail from storage. A small protocol will hereafter be described which enables this task.

A common technique to accomplish this is to set up each of the storing devices as a web server with a CGI (common gateway interface) application. The interaction of the receiving communication device 120 with the storing device can be accomplished in the same manner as a FORM interaction between a web client and a web server. A HTTP POST method can be sent from the web client to the server (receiving to storing) with the necessary parameters carried as content in the POST message. Upon reception of this message, the web server in the storing device can pass the parameters in the content onto the CG program which is managing access to the voicemail database and the requested behaviour can be performed.

Supported behaviours can include:

a) recovery of voicemail data other than content b) recovery of voicemail content c) removal of voicemail The content sent in the POST message, if used, can include:

a) identity of receiving communication device 120 (SIP address, directory number etc.)

b) identity of sending communication device 110 (SIP address, directory number etc.)

c) cryptographic hash of content d) indicator of desired recovered data (0=content, 1=data other than content)

e) command to remove voicemail (1=active, 0=inactive)

Each interaction can result in the recovery of data. This data will provide an acknowledgement function that indicates that the web server has received the message and acted upon it. This acknowledgement can further enable the web server to remove a voicemail message.

Alternatively an HTTP GET method could be used with the content described above encoded in its URL. Its interaction with the CGI program for the retrieval and management of voicemail data can be the same.

A further alternative can be to use a SIP notification system. When it is desired that the receiving communication device 120 recover the voicemail V, the receiving communication device 120 can issue a subscription for the voicemail V using the data using a SUBSCRIBE method to one of the storing devices which is storing the voicemail V. The voicemail V can be returned in a NOTIFY message by the storing device. The subscription technique could use the indicators described above for the POST method, including the indicator for the desired data and the command to remove the data.

In retrieving a voicemail V from an external storage device (e.g. external to a local network), the methods used can be the same or similar as that used for devices on an internal network. That is, HTTP or SIP methods can be used. However the identity of the storage device is generally a globally routable address. As indicated above, this identity can either be a SIP or IP address. In practice, the need for globally routable addresses can create the need for the use of a proxy server.

SIP functions inherently in this way. An external network will supply a SIP proxy server through which all SIP interactions will flow. So voicemails can be accessed by SIP interactions on devices on external networks that are not supplied with globally mutable addresses. For HTTP interactions with external networks, a similar system can be created. Hence, the receiving communication device 120 can be supplied not with the IP address of the specific storing device which is storing the voicemail V, but of the proxy server that serves it. A proxy server can service any number of local devices. On request, the proxy server could query these devices for the voicemail V, recover it and supply the voicemail V and/or any associated data to the requesting device.

Alternatively, the voicemail V can be played at the storing device and the played data is transmitted across a network to the receiving communication device 120 (e.g. streamed). Within SIP protocols, this would mean that in addition to the notification method described to obtain the voicemail data, the capability of setting up media and control sessions can also be provided. A one way media session would carry the voicemail content to the receiving communication device 120 from the storing device. A control session would proceed according to a suitable simple protocol to start, stop and otherwise manage the playing of the voicemail V.

Storage of voicemail at resources associated with the sending communication device 110 can aid in the provision of confirmation of receipt services. With access to the storage devices, a sending communication device will be able to directly confirm when and if a receiving communication device has accessed a stored voicemail. This can be of benefit for important voicemails. Far the case of the null policy in which all voicemails will be stored on resources associated with the sending communication device 110, the capability will be available for all voicemails.

In some embodiments, the sending user U can wish to initiate a voicemail without disturbing the receiving user U': e.g. a voicemail is recorded and delivered (and/or a non-intrusive notification is delivered) to the receiving communication device 120. Within ISDN protocols, methods have been previously disclosed for a sender to be able to place messages in a receiver's voice mailbox without causing their telephone to alert. Spanners have utilized this method to leave unwanted messages on unwilling receivers. This problem can also be addressed via the use of the policy 142, and specifically the use the white, black, and grey policy lists.

For example, a new header called VMOffer can be defined within SIP. A sending communication device 110 intending to offer voicemail to a receiving communication device 120 can create an INVITE message that contains this header. The SDP of this offer would be generally immaterial. The receiving communication device 120 on receiving this message would decide as to whether the resulting voicemail would be stored at the receiving communication device 120 or the sending communication device 110. It would indicate this to the sending communication device 110 in with the contents of its SDP in its reply. If that reply contains the media attribute line a=type:rcvlocalstorage with the required media connections for a voicemail connection, then storage at the sending communication device 110 storage is indicated, as described above. If the rcvlocalstorage is not present, but the media required for voicemail are, then storage at the receiving communication device 120 storage is allowed. If no media response is given in the SDP answer then the voicemail message is rejected. The choice of these alternatives can be linked to the white, black, and grey lists, as described above.

Following this negotiation, the voicemail, if allowed, will be created and the proper information transferred to the receiving communication device 120 in the case of the voicemail being stored at the sending communication device 110.

Those skilled in the art will appreciate that in some embodiments, the functionality of the application 140 can be implemented using pre-programmed hardware or firmware elements (e.g., application specific integrated circuits (ASICs), electrically erasable programmable read-only memories (EEPROMs), etc.), or other related components. In other embodiments, the functionality of the application 140 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM. ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for managing voicemail in a communication session between a sending communication device and a receiving communication device, comprising;
   determining, at the receiving communication device, that a voicemail is to be created, said voicemail based on content received via the sending communication device;
   in response to a determination that the voicemail from the sending communication device is to be created, retrieving a policy for storing the voicemail wherein the policy includes a white list of identifiers of sending communication devices for which the receiving device is authorized to create and store the voicemail at resources associated with the receiving communication device, a black list of identifiers of sending communication devices for which voicemails are not authorized to be created, and a grey list of identifiers of sending communication devices for which the receiving communication device is authorized to create voicemails, but wherein storing said voicemail occurs at resources associated with the sending communication device;
   if the sending communication device is not on the black list, recording said voicemail; and
   if the sending communication device is on the grey list, causing said voicemail to be stored at resources dedicated to storing said voicemail on behalf of the sending communication device,
   wherein a decision on where to store said voicemail made according to said policy.

2. The method of claim 1 wherein causing said voicemail to be stored at said resources associated with the sending communication device occurs only if said policy indicates that said voicemail is to be stored at said resources associated with the sending communication device.

3. The method of claim 1, wherein said policy is stored at the receiving communication device and said decision on where to store said voicemail is made at the receiving communication device.

4. The method of claim 1, wherein the sending communication device is identified by blocked caller ID information and said voicemail is treated as if the identifier of the sending communication device is on one of said black list or said grey list.

5. The method of claim 1, wherein said policy comprises at least one of a null policy and a resiliency policy, said null policy indicative that said voicemail to be stored at resources associated with the sending communication device, and said resiliency policy comprising a list of resources where said voicemail is to be stored, such that said voicemail is stored in more than one location.

6. The method of claim 5, wherein said resiliency policy is customizable for at least one of the receiving communication device and a user associated with the receiving communication device.

7. The method of claim 5, further comprising retrieving said resiliency policy from a managing device and said resiliency policy comprises identifiers of resources where said voicemail is to be stored.

8. The method of claim 1, further comprising negotiating where said storing said voicemail is to occur, based on said policy, said negotiating occurring between the sending communications device and the receiving communications device.

9. The method of claim 1, wherein said sending communication device is enabled for at least one of modification and deletion of said voicemail after said storing said voicemail at said resources associated with said sending communication device.

10. The method of claim 1, further comprising notifying the receiving communication device that said voicemail is available for retrieval once said voicemail is stored.

11. The method of claim 1, wherein said recording occurs at resources associated with said receiving communication device to create a voicemail file, and said causing said voicemail to be stored at resources associated with the sending communication device occurs by transmitting said voicemail file to said sending communication device.

12. The method of claim 11, wherein said sending communication device determines where said voicemail file is to be stored upon receiving said voicemail file.

13. A communication device for managing voicemail in a communication session between the communication device and a sending communication device, comprising,
    a communication interface for communicating with the sending communication device; and
    a processing unit enabled for performing the method according to claim 1.

14. A method for managing voicemail in a communication session between a sending communication device and a receiving communication device, comprising;
    determining, at the receiving communication device, that a voicemail is to be created, said voicemail based on content received via the sending communication device;
    in response to a determination that a voicemail from the sending communication device is to be created, retrieving a policy for storing said voicemail, and if the voicemail is to be created, creating the voicemail and performing a decision on where to store said voicemail made according to said policy; and
    causing said voicemail to be stored at resources dedicated to storing said voicemail on behalf of the sending communication device,
    wherein said policy comprises a null policy and a resiliency policy, said null policy automatically causing said voicemail to be stored at resources associated with the sending communication device, and said resiliency policy comprising a list of resources where said voicemail is to be stored, such that said voicemail is stored in more than one location, said resiliency policy is customizable for at least one of the receiving communication device and a user associated with the receiving communication device
    wherein the policy further includes a white list of identifiers of sending communication devices for which the receiving device is authorized to create and store the voicemail at resources associated with the receiving communication device, a black list of identifiers of sending communication devices for which voicemails are not authorized to be created, and a grey list of identifiers of sending communication devices for which the receiving communication device is authorized to create voicemails, but wherein storing said voicemail occurs at resources associated with the sending communication device.

15. The method of claim 14, further comprising retrieving said resiliency policy from a managing device and said resiliency policy comprises identifiers of resources where said voicemail is to be stored.

16. A communication device for managing voicemail in a communication session between the communication device and a sending communication device, comprising,
    a communication interface for communicating with the sending communication device; and
    a processing unit enabled for performing the method according to claim 14.

17. The method of claim 14, further comprising negotiating where said storing said voicemail is to occur, based on said policy, said negotiating occurring between the sending communications device and the receiving communications device.

* * * * *